United States Patent [19]
Bouvier et al.

[11] Patent Number: 5,931,958
[45] Date of Patent: Aug. 3, 1999

[54] PROCESSOR CONTROLLED LINK RESILIENCY CIRCUIT FOR SERIAL STORAGE ARCHITECTURES

[75] Inventors: Daniel Bouvier, Austin; Kenneth L. Jeffries, Leander, both of Tex.

[73] Assignee: Dell USA, L.P., Round Rock, Tex.

[21] Appl. No.: 08/837,182

[22] Filed: Apr. 11, 1997

[51] Int. Cl.[6] .................................................. G06F 11/00
[52] U.S. Cl. ............................................................ 714/48
[58] Field of Search .............................. 395/182.03, 181, 395/183.18, 185.01, 185.07; 371/62

[56] References Cited

U.S. PATENT DOCUMENTS

| | | | |
|---|---|---|---|
| 3,701,132 | 10/1972 | Bonyhard et al. | 340/174 |
| 3,733,588 | 5/1973 | Conn | 340/172.5 |
| 4,298,932 | 11/1981 | Sams | 364/200 |
| 4,344,132 | 8/1982 | Dixon et al. | 364/200 |
| 5,283,872 | 2/1994 | Ohnishi | 395/325 |
| 5,367,647 | 11/1994 | Coulson et al. | 395/325 |
| 5,758,171 | 5/1998 | Ramamurthy et al. | 395/750.01 |
| 5,768,551 | 6/1998 | Bleiweiss et al. | 395/311 |
| 5,797,018 | 8/1998 | Tavallaei et al. | 395/726 |
| 5,809,337 | 9/1998 | Hannah et al. | 395/853 |
| 5,812,752 | 9/1998 | Yamada | 395/182.03 |
| 5,835,700 | 11/1998 | Carbonneau et al. | 395/183.2 |
| 5,875,313 | 2/1999 | Sescila, III et al. | 395/309 |

*Primary Examiner*—Robert W. Beausoliel, Jr.
*Assistant Examiner*—Scott T. Baderman
*Attorney, Agent, or Firm*—Skjerven, Morrill, MaPherson, Franklin & Friel LLP; Stephen A. Terrile

[57] ABSTRACT

A serial storage architecture (SSA) storage subsystem includes a backplane, first and second storage devices, each equipped with a link resiliency circuit, connected to the backplane, an SSA initiator and a series of SSA targets, which include a backplane of the storage pod and the first and second storage devices, serially connected to the SSA initiator. Control and status registers are coupled to the link resiliency circuits. The control register transmits control signals, such as time required for the link resiliency circuits to heal line faults, to the link resiliency circuits in response to commands issued by the SSA initiator. The status register is polled by a controller to the presence of line faults detected by the link resiliency circuits. If so, the detected line faults are reported to the SSA initiator.

20 Claims, 6 Drawing Sheets

| S1 | S2 | S3 | S4 | S5 | S6 | S7 | S8 |

| C1 | C2 | C3 | C4 | C5 | C6 | C7 | C8 |

PROCESSOR CONTROLLED LINK RESILIENCY CIRCUIT FOR SERIAL STORAGE ARCHITECTURES

CROSS REFERENCE TO RELATED APPLICATION

This application is related to co-pending U.S. patent application Ser. No. 08/837,181 (Attorney Docket No. M-4168) entitled "Intelligent Backplane for Serial Storage Architectures", filed on even date herewith, assigned to the Assignee of the present application and hereby incorporated by reference as if reproduced in its entirety.

BACKGROUND

1. Related Field

The present patent application generally relates to link resiliency circuit (or "LRC") equipped serial storage architecture (or "SSA") storage subsystems and, more particularly, to a LRC equipped SSA storage subsystem having an SSA initiator and an intelligent backplane configured for the exchange of status and control information with the LRC.

2. Description of Related Art

Presently, many storage subsystems are based upon small computer systems interface (or "SCSI") architecture. Recently, however, considerable attention has been directed towards the development of storage subsystems based upon SSA. Generally, SSA-based storage subsystems are capable of providing higher level of performance, fault tolerance, data availability and connectivity than is possible with similar SCSI-based storage subsystems. SSA-based storage subsystems also offer reduced interface costs. For example, SSA-based storage subsystems require neither address switches nor discrete terminators.

SSA-based storage subsystems are arranged into a serial string of up to 128 devices, the ends of which are often connected to form a loop. Generally, such strings or loops include an SSA initiator and any number of SSA targets, most commonly, storage devices such as drives, which execute commands received from the SSA initiator, mounted in drive bays. Each of the devices included in a string or loop has first and second full duplex ports.

The drive bays of an SSA storage subsystem are linked together in series. Without the presence of an SSA drive at each drive bay, the SSA string or SSA loop would be open. Thus, a method of maintaining continuity of the SSA string or loop when an SSA drive is absent from a drive bay is needed. Continuity of the SSA string or loop may be achieved by use of a LRC. The LRC is capable of maintaining continuity of the SSA string or loop by linking around or healing a drive bay if a SSA drive is missing or otherwise not functioning. Thus, if an SSA drive fails in use, the LRC will interconnect the SSA drives on opposite sides of the failed SSA drive. It is important to note, however, that the failure of a drive located within a SSA string causes various types of link errors. For example, a message in transit when the drive fails may be lost. Link error recovery protocol (or "link ERP") provides a mechanism for recovering from the link error by attending to the retransmission of messages lost or corrupted due to the failure of an SSA drive.

While LRCs are capable of healing breaks in an SSA chain, they also can inadvertently prevent a full recovery from the break. More specifically, it is generally acknowledged that a certain amount of time is required for an SSA initiator to detect a link error. If an LRC responds too quickly in healing the break in the SSA chain, it may prevent the link error from being detected by the SSA initiator. Being unaware of the link error, the SSA initiator would not initiate link ERP, thereby preventing the recovery of those messages that were lost due to the link error.

Considerable debate has occurred as to the time period required for an SSA initiator to detect a link error. Currently, 1 millisecond is deemed sufficient. However, due to the immature nature of SSA, it is unknown if the 1 millisecond time period is adequate for all SSA configurations. Thus, it remains quite possible that the SSA initiator of certain LRC equipped SSA storage subsystems will be unable to detect link errors.

It can be readily seen from the foregoing that it would be desirable to provide an LRC equipped SSA storage subsystem having an SSA initiator and an intelligent backplane configured for the exchange of status and control information with the LRC such that the time period for the LRC to heal a break may be readily adjusted. It is, therefore, the object of this invention to provide such an SSA storage subsystem.

SUMMARY

A serial storage architecture (SSA) storage subsystem includes a backplane, first and second storage devices, each equipped with a link resiliency circuit, connected to the backplane, an SSA initiator, a plurality of SSA targets, which include a backplane of the storage pod and the first and second storage devices, serially connected to the SSA initiator and a control register, coupled to the link resiliency circuits, for transmitting control signals, such as time required for the link resiliency circuits to heal line faults, to the link resiliency circuits in response to commands issued by the SSA initiator. In one aspect of this embodiment of the invention, the control register includes a control bit for each of the link resiliency circuits.

In another embodiment, the present invention is of a serial storage architecture (SSA) storage subsystem which includes a backplane, first and second storage devices, each equipped with a link resiliency circuit, connected to the backplane, an SSA initiator, a plurality of SSA targets, which include a backplane of the storage pod and the first and second storage devices, serially connected to the SSA initiator and a first status register, coupled to the link resiliency circuits, for indicating presence of line faults detected by the link resiliency circuits.

In one aspect thereof, the present invention further includes a controller which polls the first status registers to determine if the link resiliency circuits have detected line faults and reports detected line faults to the SSA initiator. Preferably, the first status register includes a status bit corresponding to each storage device. In another aspect thereof, a second status register, also coupled to the link resiliency circuits, for indicating presence of the drives coupled to the link resiliency circuits, is also provided. Preferably, the second status register includes a status bit corresponding to each storage device.

DETAILED DESCRIPTION

Figure 1:
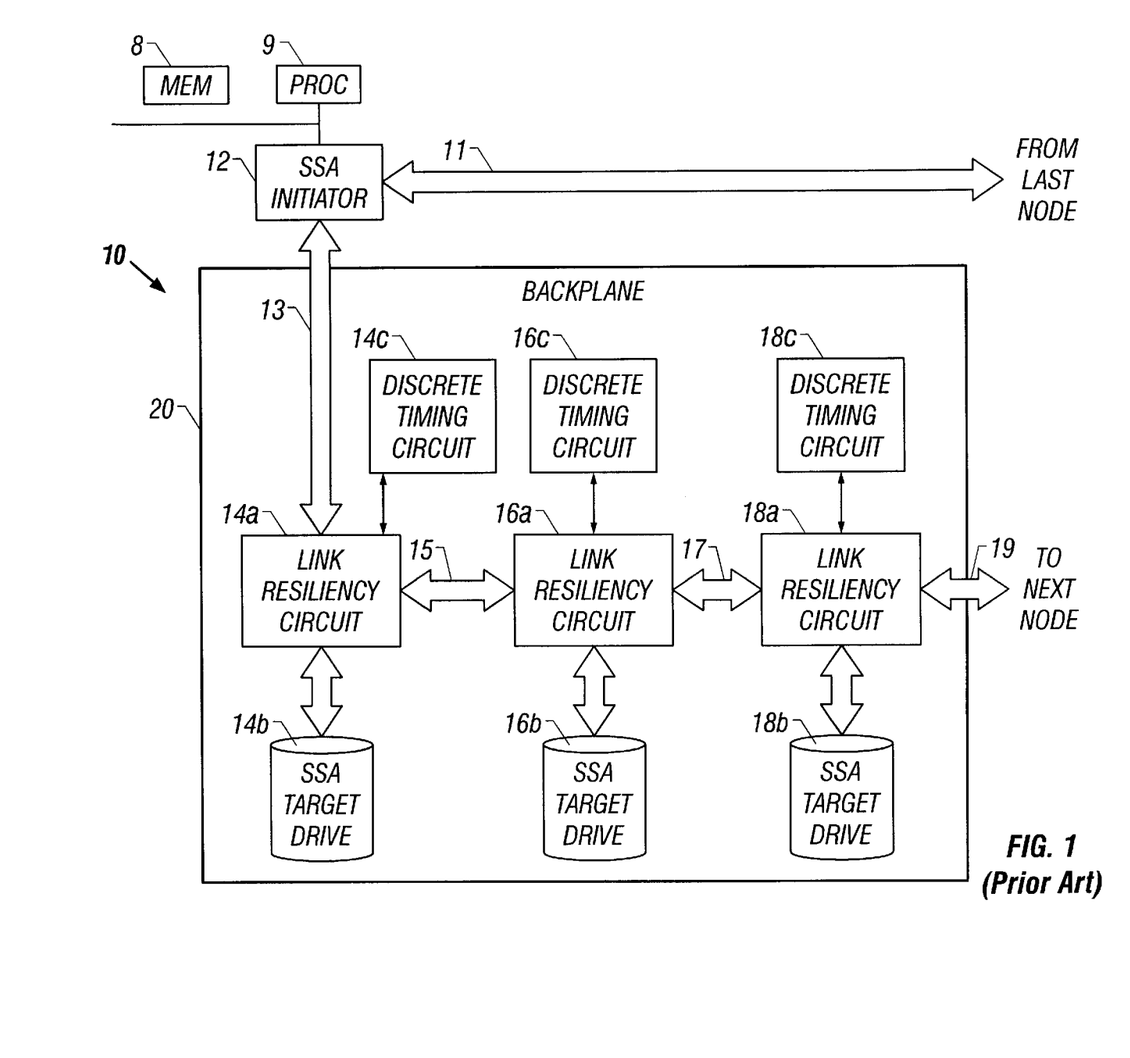
FIG. 1 is a block diagram of a conventional LRC equipped SSA storage subsystem.

Referring now to FIG. 1, a conventional SSA storage subsystem 10 will now be described in greater detail. Storage subsystem 10 is coupled via a conventional bi-directional bus to processor 9 and memory 8 of a computer via SSA initiator 12. The combination of the processor 9, memory 8 and SSA storage subsystem 10 provides a computer system such as a server system. The LRC equipped SSA storage subsystem 10 is arranged as a SSA loop, i.e., a cyclic web containing dual-port nodes only. While a SSA loop may include as many as 128 dual-port nodes, for ease of illustration, only four such nodes are shown in FIG. 1. The illustrated nodes include SSA initiator 12, i.e., a node that issues commands, and first, second and third SSA targets, i.e., nodes that execute commands. Link 11 couples the SSA initiator 12 to that portion of the SSA storage subsystem 10 included in the SSA loop but not illustrated in FIG. 1, link 13 couples the SSA initiator 12 to a first SSA target drive 14b, link 15 couples the first SSA target drive 14b to a second SSA target drive 16b, link 17 couples the second SSA target 16b and a third SSA target drive 18b and link 19 couples the third SSA target drive 18b with that portion of the SSA storage subsystem 10 included in the SSA loop but not illustrated in FIG. 1.

It should be clearly understood that, while the terms SSA targets and SSA initiators may encompass systems, devices and controllers, as disclosed herein, the first, second and third SSA targets are first, second and third drives, respectively and the SSA initiator 12 is a controller which controls I/O accesses to the first, second and third SSA target drives.

While FIG. 1 appears to suggest that the links 13, 15 and 17 respectively couple the SSA initiator 12 to LRC 14a, the LRC 14a to LRC 16a and the LRC 16a to LRC 18a, rather than coupling the SSA initiator 12 to the first SSA target drive 14b, the first SSA target drive 14b to the second SSA target drive 16b and the second SSA target drive 16b to the third SSA target drive 18b, the LRCs 14a, 16a and 18a may more accurately be viewed as front ends to the corresponding SSA target drives 14b, 16b and 18b. As will be more fully described below, if the SSA target drive is functioning, the LRC relays a message received thereby to the SSA target drive for handling. If, however, the SSA target drive is missing, failed or otherwise unavailable, the LRC will relay that message to the LRC associated with the next SSA target.

Each LRC 14a, 16a and 18a includes a select input line, the state of which determines whether a message is to be directed to the corresponding SSA target drive or to the LRC of the next SSA target drive. For example, the default level for the select input line may be set to low and, when the select input line is at the default level, data input the LRC is directed to the corresponding SSA target drive. If the select input line is driven high, however, data input the LRC is directed to the LRC of the next SSA target drive.

The LRC further includes a line fault detection output line. Upon detection of a line fault, the LRC drives the line fault detection line high, thereby triggering the corresponding discrete timing circuit to begin a countdown sequence having a preselected duration. When the preselected time period elapses, the discrete timing circuit drives the select input high, thereby causing the LRC to thereafter direct data to the LRC of the next SSA target drive. In this manner, a pre-selected time delay, typically, 1 millisecond, between the occurrence of the line fault and the healing of the line is imposed. By delaying healing of the line in this manner, notification of the line fault to the SSA initiator 12 is ensured, thereby enabling full recovery for the SSA subsystem 10 through use of link ERP.

The first, second and third SSA target drives 14b, 16b and 18b are attached to backplane 20. While not literally part of the SSA storage subsystem 10, the backplane 20 is a device to which the first, second and third SSA target drives 14b, 16b and 18b are attached. For example, the backplane 20 may be in a disk pod having a series of drive bays in which the first, second and third SSA target drives 14b, 16b and 18b are installed. The backplane 20 is non-intelligent. Thus, in the event of a drive failure, the backplane 20 would be unable to identify, isolate or issue an alert regarding the failing drive. Furthermore, while the drives 14, 16 and 18 are attached to the backplane 20 are SSA targets, the backplane 20 itself is not. Thus, even if the backplane 20 were intelligent, the SSA initiator 12 would be unable to communicate with the backplane 20, for example, to adjust timing of the LRCs 14a, 16a and 18a based upon the configuration of the SSA storage subsystem 10.

Figure 2:
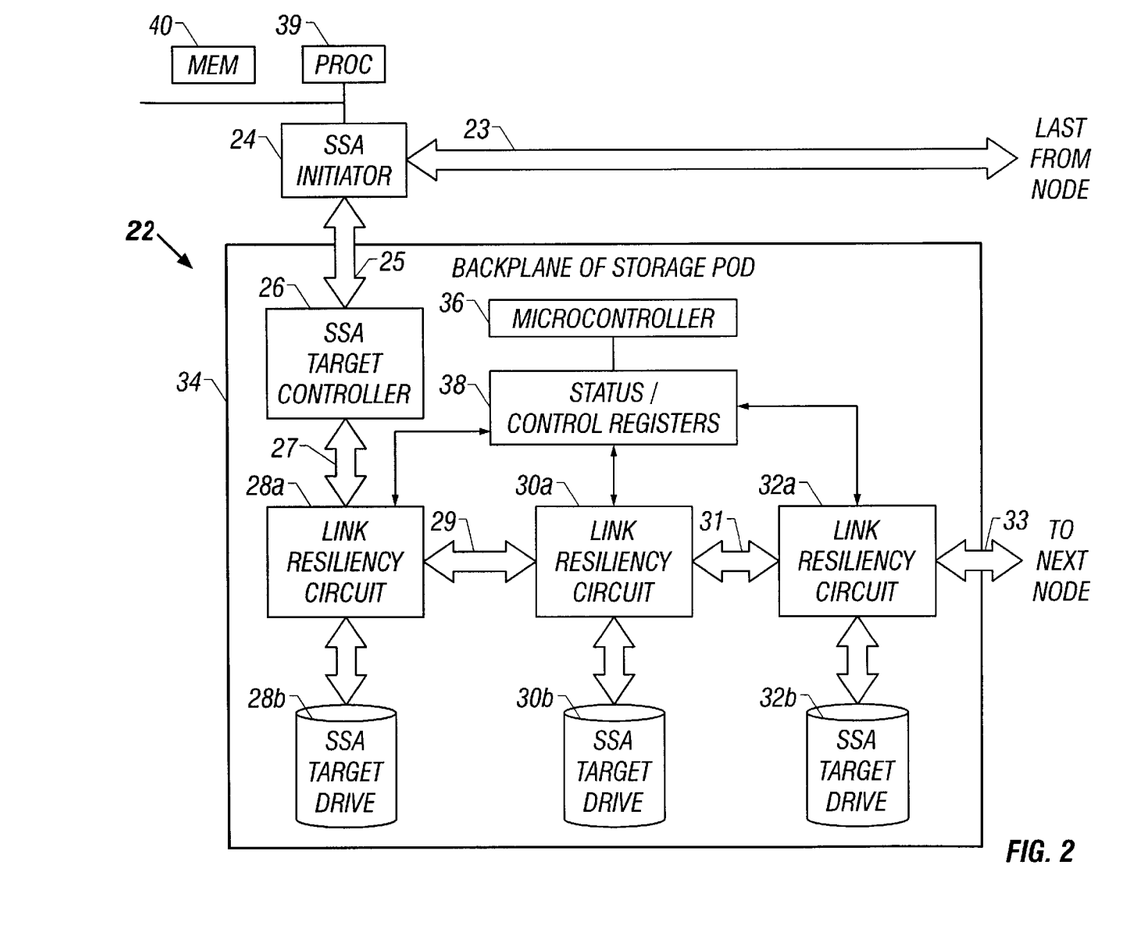
FIG. 2 is a block diagram of an LRC equipped SSA storage subsystem.

Referring next to FIG. 2, an SSA storage subsystem will now be described in greater detail. As before, the SSA storage subsystem 22 is arranged in a SSA loop configuration in which an SSA initiator 24 issues commands to a series of SSA targets, including several which reside on an intelligent backplane 34 of an apparatus, for example, a disk pod, capable of housing plural storage devices. More specifically, link 23 couples the SSA initiator 24 to that portion of the SSA storage subsystem 22 included in the SSA loop but not illustrated in FIG. 2, link 25 couples the SSA initiator 24 to a first SSA target 26, link 27 couples the first SSA target 26 to a second SSA target drive 28b, link 29 couples the second SSA target drive 28b to a third SSA target drive 30b, link 31 couples the third SSA target drive 30b to a fourth SSA target drive 32b and link 33 couples the fourth SSA target drive 32b to that portion of the SSA storage subsystem 22 included in the SSA loop but not illustrated in FIG. 2.

As before, the LRCs 28a, 30a and 32a may be viewed as a front end to the corresponding SSA target drives 28b, 30b and 32b. As will be more fully described below, if an SSA target drive is functioning, the corresponding LRC relays a message received thereby to the SSA target drive for handling. If, however, the SSA target drive is missing, failed or otherwise unavailable, the LRC will relay that message to the LRC associated with a next SSA target device.

In the foregoing description, the backplane 34 is referred to as an "intelligent" backplane. By the term "intelligent", it is intended to refer to the ability of the backplane to independently collect and process data, issue notifications of the occurrence of events based upon information derived from the collected data and accept instructions which alters its operation or the operation of devices residing thereon.

Unlike conventional SSA storage subsystems such as the SSA storage subsystem 10 illustrated in FIG. 1, the SSA initiator 24 is capable of directly transmitting control commands to the intelligent backplane 34 of the disk pod. This is accomplished by converting the intelligent backplane 34 itself into an additional SSA target for the SSA initiator 24. Specifically, the first SSA target 26 is an SSA target controller 26 installed in the intelligent backplane 34 while the second, third and fourth SSA targets are drives attached to the backplane 34. Coupled to the SSA target controller 26 is a microcontroller 36. In turn, the microcontroller 36 is coupled to a series of status and/or control registers 38. As will be more fully described below, the SSA target controller 26, in conjunction with the microcontroller 36 and the status/control registers 38, enable the exchange of status and control information between the SSA initiator 24 and the LRCs 28a, 30a and 32a, as well as between the SSA initiator 24 and the SSA target drives 28b, 30b and 32b, via the intelligent backplane 34. Because intelligent backplane 34 functions as an additional SSA target, SSA storage subsystem 22 provides the advantage of allowing devices which are attached to backplane 34 to be spacially located.

Specifically, for each status register included in the status and/or control registers 38, each LRC 28a, 30a and 32a is provided with an output line coupled to a status bit of the corresponding status register. Each LRC will either assert or de-assert the output line based upon certain conditions at the LRC, thereby setting or resetting the corresponding status bit in the status register. By periodically polling the status register, the microcontroller 36 will detect any state changes in the status bits. The microcontroller 36 would then advise the SSA initiator 24 of an event related to an operating parameter of the LRC which caused any such detected state changes by transmitting a message to the SSA initiator 24 via the SSA target controller 26.

Conversely, for each control register included in the status and/or control registers 38, the control register includes a control bit coupled to each LRC 28a, 30a and 32a by a control line. To control a selected LRC, for example, to adjust timing of the LRC based upon configuration of the SSA storage subsystem 22, the SSA initiator 24 would transmit an instruction, via the SSA target controller 26, to the microcontroller 36 to set or reset a selected control bit. By changing the state of a control bit, a control signal, the assertion of which causes an activity to occur, is transmitted to the corresponding LRC.

Figure 3A:
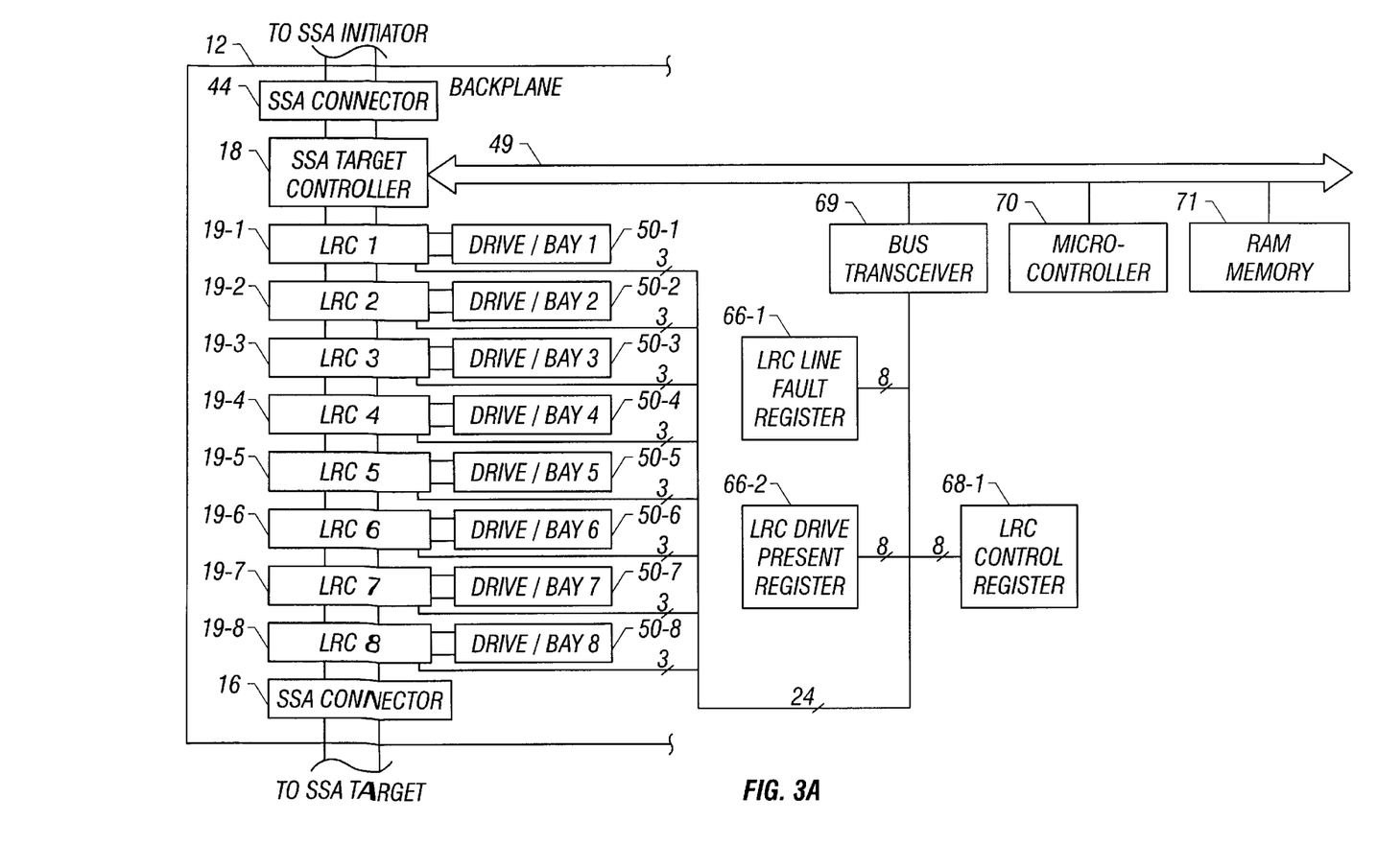
FIG. 3A is an expanded block diagram of a first embodiment of the LRC equipped SSA storage subsystem illustrated in FIG. 2.

Referring next to FIG. 3A, a first embodiment of an intelligent backplane for an LRC equipped SSA storage subsystem such as that illustrated in FIG. 2 will now be described in greater detail. In the embodiment illustrated herein, the intelligent backplane 42 is that portion of a disk pod which interconnects the disk pod with other devices such as storage devices installed in the disk pod. It is specifically contemplated, however, that the intelligent backplane 42 may be part of various types of apparatuses, other than those specifically disclosed herein, which house one or more storage devices.

As may now be seen, a first dual port SSA connector 44 provided on the intelligent backplane 42 couples an SSA initiator (not visible in FIG. 3A) to the intelligent backplane 42 while a second dual port SSA connector 46 provided on the intelligent backplane 42 couples the last SSA target residing on the intelligent backplane 42 to a next SSA target (also not visible in FIG. 3A). The first SSA connector 44 bi-directionally couples the SSA initiator to a first SSA target, specifically, an SSA target controller 48 which resides on the intelligent backplane 42. A device suitable for use as the SSA target controller 48 may be, for example, a SSA Protocol Controller manufactured by Symbios Logic Inc. of Wichita, Kans.

Connected in series between the SSA target controller 48 and the second dual port SSA connector 46 are first, second, third, fourth, fifth, sixth, seventh and eighth drives, all of which are SSA targets. Each SSA target drive is insertably mounted in a corresponding disk bay included in the disk pod. In FIG. 3A, the first, second, third, fourth, fifth, sixth, seventh and eighth SSA target drives, together with the corresponding disk bays, are collectively illustrated as drive/bay 50-1 through 50-8, respectively.

Each drive/disk bay 50-1 through 50-8 is provided with a corresponding LRC 49-1 through 49-8 which couples the SSA target drive to the adjacent SSA target drives included in the SSA storage subsystem. If the corresponding SSA target drive is operating properly, data input the LRC is directed to the SSA target drive. If the SSA target drive has failed or is missing, however, data input the LRC is directed to the LRC corresponding to the next SSA target drive.

It should be noted that, while FIG. 3A illustrates eight drives residing in associated disk bays, it should be noted that the number of SSA target drives and associated disk bays illustrated as residing in the disk pod and included in the SSA storage subsystem is purely exemplary and may be varied without departing from the scope of the present invention. It should be further noted that all of the drives and associated disk bays are included as SSA target drives of the SSA storage subsystem, it is specifically contemplated that one or more of the drives and associated disk bays may be excluded from the SSA storage subsystem. For example, a particular disk bay may be empty or a drive installed in that disk bay may be assigned to a second SSA storage subsystem.

Each LRC 49-1 through 49-8 includes two output lines, each coupled to a corresponding status register 66-1 and 66-2, and one input line coupled to a control register 68-1. Again, it should be clearly noted that the number of status and control registers is purely exemplary and may be varied depending on the desired status and control capabilities for the intelligent backplane 42.

As disclosed herein, each LRC 49-1 through 49-8 is comprised of a pair of mix mode multi-plexors controlled by a single select input line. To couple the LRC to the remainder of the SSA storage subsystem, each LRC 49-1 through 49-8 should further include first, second and third two-way ports. For example, for the LRC 49-2, the first, second and third two-way port couple the LRC 49-2 to the LRC 49-1, the SSA target drive installed in drive/bay 50-2 and the LRC 49-3, respectively. The LRC also includes a LRC line fault output line for indicating that a line fault has been detected, a LRC drive present output line which indicates whether there is a drive installed in the corresponding disk bay and a select input line, the state of which determines whether a message is to be directed to the corresponding SSA target drive or to the LRC of the next SSA target drive. A device suitable for use as the LRCs 49-1 through 49-8 may be, for example, a SSALRC20 device manufactured by Symbios Logic Inc. of Wichita, Kans.

Figure 3B:
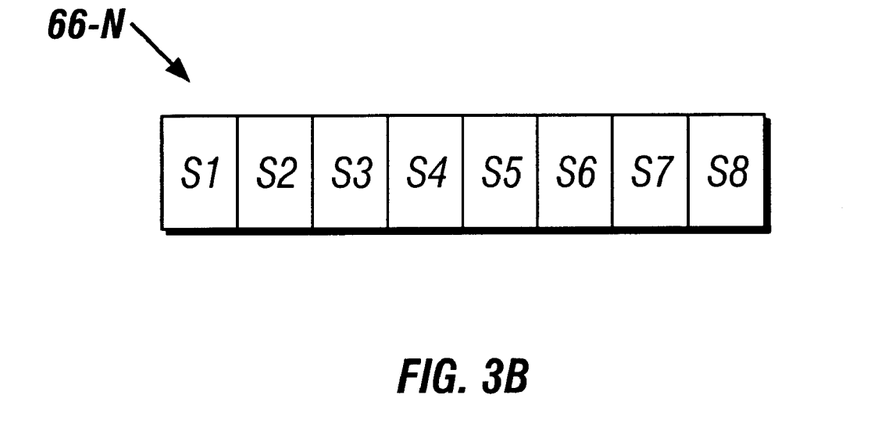
FIG. 3B is a block diagram of an exemplary status register for the intelligent backplane of FIG. 3A.
Figure 3C:
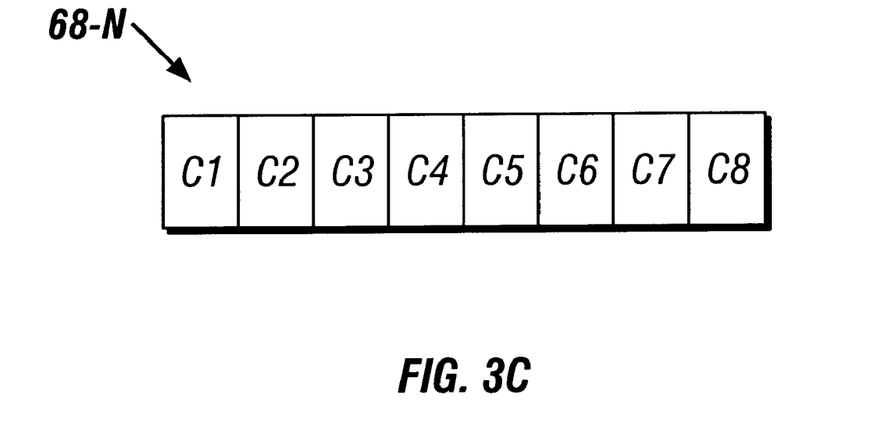
FIG. 3C is a block diagram of an exemplary control register for the intelligent backplane of FIG. 3A.

Referring momentarily to FIGS. 3B–C, exemplary status and control registers 66-N and 68-N may now be seen. Status register 66-N includes a status bit S1–S8 for each LRC 49-1 through 49-8 coupled thereto. Upon a change in status of a parameter reportable by an LRC to the status register 66-N, the corresponding status bit will be set or reset by asserting or de-asserting the output line coupling the LRC and the corresponding status bit. Similarly, control register 68-N includes a control bit C1–C8 for each LRC 49-1 through 48-8. To issue a control signal to a selected LRC, an SSA initiator will set or reset the corresponding control bit, thereby issuing the control signal to the selected LRC.

Returning now to FIG. 3A, the status registers 66-1 through 66-2 will now be described in greater detail. The status registers 66-1 through 66-2 include a LRC line fault register 66-1 and an LRC drive present register 66-2 respectively connected to the LRC line fault output line and the LRC drive present output line for each of the LRCs 49-1 through 49-8. When the lines which serially connect a SSA target drive to the remainder of the SSA storage subsystem are functioning properly, the LRC line fault detection line is held to a first, default, level, for example, to a logical "0". When a line fault is detected on the lines which serially connect the SSA target drive to the remainder of the SSA storage subsystem, the LRC asserts the LRC line fault detection line by driving the line to a second level, for example, to a logical "1", thereby setting the corresponding status bit in the LRC line fault detection register 66-1. By periodically polling the LRC line fault detection register 66-1, the microcontroller 70 will detect any state changes in the status bits of the LRC line fault detection register 66-1, and report the occurrence and location of any line faults to the SSA initiator by transmitting a notification message via the SSA target controller 48.

When the SSA target drive coupled to the LRC is present and operating properly, the LRC drive present register is held to a first, default, level, for example, to a logical "0". If the drive is removed or otherwise disconnected from the LRC, the LRC asserts the LRC drive present line by driving the line to a second level, for example, to a logical "1", thereby setting the corresponding status bit in the LRC drive present register 66-2. As before, by periodically polling the LRC drive present register 66-2, the microcontroller 70 will detect any state changes in the status bits of the LRC line fault detection register 66-1, and report the occurrence and location of any removals of SSA target drives to the SSA initiator by transmitting a notification message via the SSA target controller 48.

Bus 49 and bus transceiver 69 enables the exchange of signals between the microcontroller 70 and the LRC line fault register 66-1 and the LRC drive present register 66-2. Upon power-up, the microcontroller 70 will determine the state of the status bits of the LRC line fault register 66-1 and the LRC drive present register 66-2 and stores the acquired information in RAM memory 71. Thereafter, the microcontroller 70 periodically polls the LRC line fault register 66-1 and the LRC drive present register 66-2 to determine any changes in the state of the status bits S1–S8. If the microcontroller 70 detects a change in the state of any of the status bits, the microcontroller 70 will retrieve information stored in the RAM memory 71 as to the type of event occurrence indicated by the detected change in state and issue a notification, via the SSA target controller 48, to the SSA initiator, of the event which has occurred.

The control register 68-1 is an LRC control register 68-1. Each LRC 49-1 through 49-8 includes a select input line coupled to a corresponding control bit of the LRC control register 68-1. When the LRC control bit is set to a logical "0", the select input line is de-asserted and data directed to the LRC is passed to the SSA target drive. If, however, the control bit is set to a logical "1", the select input line is asserted and data directed to the LRC is passed to an adjacent LRC. Thus, by setting or resetting selected control bits of the LRC control bit 66-1, the SSA initiator may selectively heal around a missing drive or keep the string of SSA devices opened.

The intelligent backplane 42 is further configured such that the SSA initiator for the SSA storage subsystem is able to execute at least one control operation. For example, the SSA initiator, or a system administrator located at the terminal where the SSA initiator resides, may evaluate the status information issued by the intelligent backplane 42 and, based on the received information, issue an instruction to the microcontroller 70 to cause the LRC control register 68-1 to assert the select signal to a selected LRC to cause the selected LRC to heal the detected line fault. In this manner, the SSA initiator, rather than a discrete timing circuit, can determine how long after a line fault has occurred should the LRC heal the fault.

To issue an instruction to a selected LRC coupled to the intelligent backplane 42, an SSA initiator will transmit an appropriate instruction to the SSA target controller 48. The SSA target controller 48 examines a header portion of received instruction to determine whether the destination of the instruction is the intelligent backplane 42. Otherwise, the instruction is passed on to the next SSA target 50-1, here, a SSA target drive installed in a disk bay. Upon determining that the destination of a received instruction is the intelligent backplane 42, the SSA target controller 48 propagates the received instruction to the microcontroller 70 for execution. For example, if the received instruction indicates that a selected LRC should heal around a missing drive, the microcontroller 70 will set the control bit of the LRC control register which is coupled to the LRC corresponding to the missing drive, thereby issuing a control signal to the selected LRC which causes the specified activity to occur.

Figure 4A:
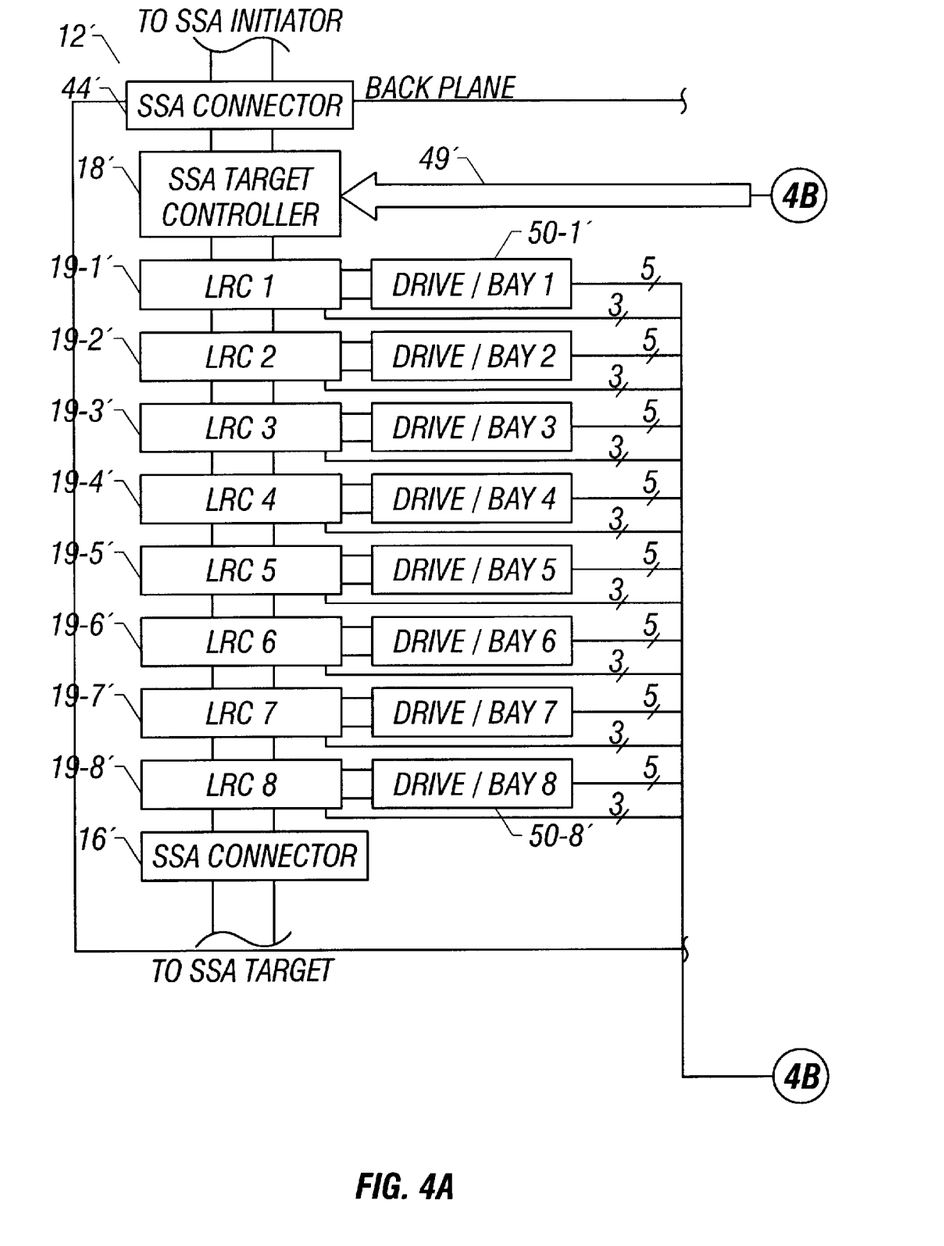
FIG. 4 is an expanded block diagram of an second, preferred, embodiment of the LRC equipped SSA storage subsystem illustrated in FIG. 2.
Figure 4B:
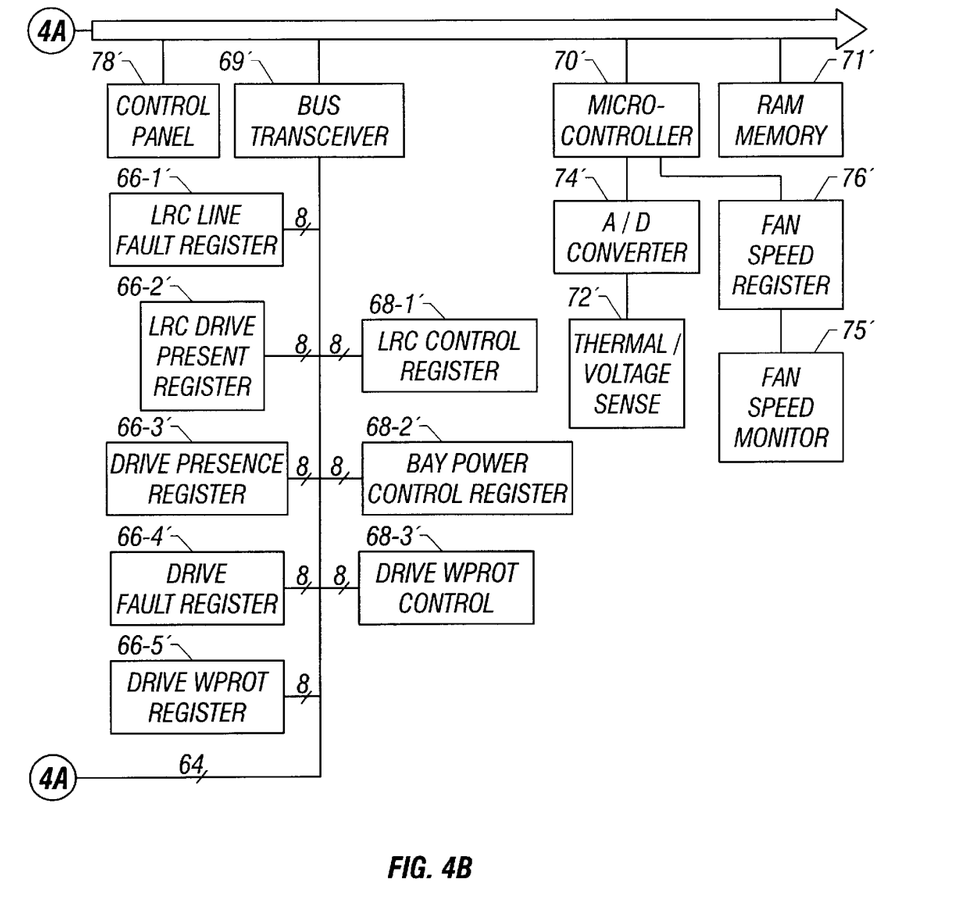

Referring next to FIG. 4, a second, preferred, embodiment of an intelligent backplane for an LRC equipped SSA storage subsystem such as that illustrated in FIG. 2 will now be described in greater detail. In this embodiment, the intelligent backplane 42' is provided additional status and control registers for exchanging status and control information with the SSA initiator. Further details regarding these additional status and control registers are set forth in U.S. patent application Ser. No. 08/837,181 (Atty. Docket No. DELL-01083/M-4168), filed on even date herewith, and previously incorporated by reference as if reproduced in its entirety.

As before, in this embodiment, a first dual port SSA connector 44' provided on the intelligent backplane 42' couples an SSA initiator (not visible in FIG. 4) to the intelligent backplane 42' while a second dual port SSA connector 46' provided on the intelligent backplane 42' couples the last SSA target residing on the intelligent backplane 42' to a next SSA target (also not visible in FIG. 4). The first SSA connector 44' bi-directionally couples the SSA initiator to a first SSA target, specifically, an SSA target controller 48'.

Connected in series between the SSA target controller 48' and the second dual port SSA connector 46' are first, second, third, fourth, fifth, sixth, seventh and eighth drives, all of which are SSA targets. Each SSA target drive is insertably mounted in a corresponding disk bay included in the disk pod. In FIG. 4, the first, second, third, fourth, fifth, sixth, seventh and eighth SSA target drives, together with the corresponding disk bay, are collectively illustrated as drive/bay 50-1' through 50-8', respectively.

Each drive/disk bay 50-1' through 50-8' is provided with a corresponding LRC 49-1' through 49-8' which couples the SSA target drive to the adjacent SSA targets included in the SSA storage subsystem. If the corresponding SSA target drive is operating properly, data input the LRC is directed to the SSA target drive. If the SSA target drive has failed or is missing, however, data input the LRC is directed to the LRC corresponding to the next SSA target drive.

In the embodiment of the invention illustrated herein, in addition to the LRC line fault and LRC drive present lines respectively output each LRC 49-1' through 49-8' to the LRC line fault register 66-1' and the LRC drive present register 66-2', each drive/bay 50-1' through 50-8' includes three output status lines, each coupled to a corresponding status register 66-3' through 66-5'. Similarly, in addition to the input control line which couples each LRC 49-1' through 49-8' to the LRC control 68-1', 68-1', in this embodiment of the invention, each drive/bay 50-1' through 50-8' includes first and second input control lines respectively coupled to control registers 68-2' and 68-3'. As before, it should be clearly noted that the number of status and control registers is purely exemplary and may be varied depending on the desired status and control capabilities for the intelligent backplane 42'.

The status register 66-3' is a drive presence detection register. Each disk bay 50-1' through 50-8' includes a drive presence sensor which detects installation and/or removal of a SSA target drive from the corresponding disk bay. When the disk bay is empty, the drive presence sensor drives an output line coupled to the corresponding status bit of the drive presence detection register 66-3' to a first, default, level, for example, to a logical "0". When a drive is inserted into the disk bay, the drive presence sensor drives the output line to a second level, for example, to a logical "1".

The status register 66-4' is a drive fault register 66-4'. Storage devices which comply with the X3T10 SSA specification are equipped with a drive fault detection line suitable for issuing an alert regarding a drive fault. Traditionally, however, the aforementioned drive fault detection line has been limited to driving a drive fault detection LED physically located at the storage device. Thus, if the storage device was remotely located relative to the remainder of the SSA storage subsystem, for example, in an adjoining room, illumination of the drive fault detection LED may not be detected. Here, however, the drive fault detection line is coupled to the drive fault register 66-4'. When the SSA target drive is operating normally, the drive fault detection line is held to a first, default, level, for example, to a logical "0". When a fault is detected, the SSA target drive asserts the drive fault detection line by driving the line to a second level, for example, to a logical "1".

The status register 66-5' is a drive write protect register 66-5'. Storage devices which comply with the X3T10 SSA specification are equipped with a drive write protect pin which allows the storage device to be write protected. Traditionally, drive write protection of the storage device is controlled by a user settable jumper. A drive write connect output line couples the drive write protect pin of each SSA target drive to the drive write protect register 66-5'. When writes to the drive are permitted, the drive write protect line is held to a first, default, level, for example, to a logical "0" by the drive write protect pin. When write protection is enabled, the drive write protect pin is driven to a second level, for example, to a logical "1", thereby asserting the drive write protect line.

Bus 49' and bus transceiver 69' enables the exchange of signals between the microcontroller 70' and the status registers 66-3' through 63-5'. Upon power-up, the microcontroller 70' will determine the state of the status bits of the drive presence detection register 66-1', the drive fault register 66-2' and the drive write protect register 66-3' and stores the acquired information in RAM memory 71'. Thereafter, the microcontroller 70' periodically polls the drive presence detection register 66-1', the drive fault register 66-2' and the drive write protect register 66-3' to determine any changes in the state of the status bits S1–S8. If the microcontroller 70' detects a change in the state of any of the status bits for the drive presence detection registers 66-1', the microcontroller 70' will retrieve information stored in the RAM memory 71' as to the type of event occurrence indicated by the detected change in state and issue a notification, via the SSA target controller 48', to the SSA initiator, of the event which has occurred.

For example, if the microcontroller 70' detects that a status bit of the drive presence register 66-1' transitioned from 0 to 1, the microcontroller 70' notifies the SSA initiator that a drive has been inserted in the particular disk bay coupled to the transitioning status bit. As the SSA initiator will be in the process of assigning an numerical SSA address to the drive, the SSA initiator will append physical information related to the disk bay, for example, location of the disk bay to the numerical SSA address. Conversely, if the microcontroller 70' detects that a status bit of the drive presence register 66-1' has transitioned low, the microcontroller 70' notifies the SSA initiator that the drive housed in a particular disk bay has been removed, thereby contemporaneously advising the SSA initiator of the removal of a drive from the disk pod so that the numerical addresses for the devices which comprise the SSA storage subsystem may be reassigned.

The intelligent backplane 42' may be configured to monitor other operating conditions for the occurrence of events. To provide such enhanced monitoring capabilities, the intelligent backplane should be equipped with additional monitoring sensors and/or status registers. Any such additional status registers may be included in the status registers 66-N' or, as disclosed in the embodiment of the invention illustrated in FIG. 4, independently coupled to the microcontroller 70'.

More specifically, installed in the interior of the disk pod housing and coupled to the intelligent backplane 42' are temperature/voltage sensors 72'. The temperature/voltage sensors 72' include a voltage sensor for determining the voltage level of power supplied to the disk pod and a temperature sensor for determining the internal operating temperature of the disk pod. The voltage level and operating temperature for the disk pod determined by the temperature/voltage sensors 72' are transmitted to analog-to-digital converter 74' where there are converted into digital values. The converted values of voltage level and operating temperature are then transmitted to the microcontroller 70' which determines whether power or thermal events have occurred by comparing the received values of voltage level and operating temperature to pre-selected operating ranges. If the microcontroller 70' determines that either the voltage level or operating temperature is outside the corresponding pre-selected operating range, the microcontroller 70' will issue a notification to the SSA initiator of the occurrence of a power or thermal event.

The disk pod or other storage structure which houses the SSA target drives will typically include one or more cooling fans to maintain the proper ambient temperature within the housing. Depending on its configuration, a cooling fan may be equipped with a monitoring pin or other fan speed monitoring device capable of determining rotating speed of the cooling fan. If so equipped, the fan speed monitoring device will continuously transmit the rotating speed of the cooling fan to fan speed register 76'. The microcontroller 70' periodically polls the fan speed register 76' to determine rotating speed of the cooling fan and, by comparing the rotating speed to a pre-selected operating range stored in the RAM memory 71', determines whether the rotating speed is outside the corresponding pre-selected range of rotating speeds. If so, the microcontroller 70' will issue a notification to the SSA initiator of the occurrence of a cooling fan event. For example, if the rotating speed is below the pre-selected range, the microcontroller 70' will issue a notification of a fan underspeed event. Conversely, if the rotating speed is above the pre-selected range, the microcontroller 70' will issue a notification of an fan overspeed event.

In this embodiment, the intelligent backplane 42' is further configured with additional control registers—bay power control register 68-2' and drive write protect control register 68-3'—capable of causing the drive/bays 50-1 through 50-8 to execute selected instructions. For example, the network administrator may evaluate the status information issued by the intelligent backplane 42' and, based on the received information, issue an instruction to the microcontroller 70' to cause a selected control register to transmit a control signal to a selected drive/bay, thereby causing a selected activity to occur.

To issue an instruction to a selected disk bay coupled to the intelligent backplane 42', an SSA initiator will transmit an appropriate instruction to the SSA target controller 48'. The SSA target controller 48' examines a header portion of received instruction to determine whether the destination of the instruction is the intelligent backplane 42'. Otherwise, the instruction is passed on to the next SSA target 50-1', here, a SSA target drive installed in a disk bay. Upon determining that the destination of a received instruction is the intelligent backplane 42', the SSA target controller 48' propagates the received instruction to the microcontroller 70' for execution. For example, if the received instruction indicates that a specific activity is to occur at a selected disk bay, the microcontroller 70' will set or reset the control bit coupled to the selected drive for the corresponding command register, thereby issuing a control signal to the selected disk bay which causes the specified activity to occur.

As before, the bus transceiver 69' enables the microcontroller 70' to transmit commands to control register 68-1' and drive write protect register 68-2' via the bus 49'. The control register 68-2' is a bay power control register. Each disk bay includes a power control line coupled to a corresponding control bit of the bay power control register 68-2'. When the control bit is set to a logical "0", the corresponding power control line is de-asserted and the drive bay is powered down. If, however, the control bit is set to a logical "1", the power control line is asserted and the drive bay is powered up. Thus, by setting or resetting selected control bits of the bay power control register 68-2', the SSA initiator may selectively power up or power down a selected disk bay. For example, when a drive is inserted or "hot plugged" into a selected bay, the microcontroller 70' will detect the change in state in the corresponding status bit of the drive presence register 66-3' and notify the SSA initiator that a drive is being inserted in a selected disk bay. In response thereto, the SSA initiator powers up the bays into which the drive is inserted. Since the drive bay into which the drive is inserted is powered down at the time of insertion, hot plugging a drive into this bay does not affect the other drives inserted in the disk pod.

The control register 68-3' is a drive write protect control register. It is expected that the X3T10 SSA specification will include an active write protect control line capable of switching a storage device into or out of a write protect mode. Each SSA target drive includes a write protect control line coupled to a corresponding control bit of the write protect control register 68-3'. To switch a selected SSA target drive into write protect control, the SSA initiator issues a command to set the control bit of the write protect control register 68-3', thereby asserting the write protect control line and switching the selected drive into write protect control. In this manner, the SSA initiator may selectively switch one or more SSA target drives into write protect mode.

The intelligent backplane 42' may be configured for further control capability by providing a control panel 78' coupled to the bus 49'. The control panel 78' includes an LCD or other type of display on which messages issued by the SSA initiator may be displayed. For example, if the microcontroller 70' had previously advised the SSA initiator that a particular SSA target drive has failed, in addition to appropriate corrective such as that previously described, the network administrator may used the SSA initiator to issue a message such as "fault detected at drive X" to the SSA target controller 48' which, in turn, directs the message to the control panel 78' for display.

Thus, there has been described and illustrated herein, an SSA storage subsystem having an SSA initiator capable of exchanging status and control information with LRCs associated with SSA target drives of the SSA storage subsystem. Such an improvement has been achieved by providing intelligence to the backplane where the LRCs and SSA target drives reside. By doing so, the SSA initiator is capable of controlling the time period required for the LRC to heal, thereby ensuring that the disclosed LRC is suitable for use regardless of the particular configuration of the SSA storage subsystem. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A serial storage architecture (SSA) storage subsystem, comprising:

a backplane;

first and second storage devices coupled to said backplane, said first storage device equipped with a first link resiliency circuit and said second storage device equipped with a second link resiliency circuit;

an SSA initiator;

a plurality of SSA targets serially connected to said SSA initiator, said SSA targets including said backplane and said first and second storage devices;

a first status register coupled to said first and second link resiliency circuits, said first status register indicating presence of line faults detected by said first and second link resiliency circuits; and, a controller coupled to said first status register and said SSA initiator, said controller polling said first status register to determine if said first and second link resiliency circuits have detected line faults and reporting detected line faults to said SSA initiator.

2. An SSA storage subsystem according to claim 1 wherein:

said first status register further comprises a status bit for each of said first and second link resiliency circuits;

upon detection of a line fault thereby, said first and second link resiliency circuits asserting said respective status bit.

3. An SSA storage subsystem according to claim 2 and further comprising:

first and second disk bays for respectively connecting said first and second storage devices to said backplane.

4. An SSA storage subsystem according to claim 3 and further comprising:
   a second status register coupled to said first and second link resiliency circuits, said second status register indicating presence of said first and second storage devices in said first and second disk bays, respectively.

5. An SSA storage subsystem according to claim 4 wherein:
   said second status register further comprises a status bit for each of said first and second link resiliency circuits;
   upon absence of one of said first and second storage devices from said corresponding disk bays, said first and second link resiliency circuits asserting said respective status bit.

6. A serial storage architecture (SSA) storage subsystem, comprising:
   an intelligent backplane;
   a plurality of storage devices coupled to said intelligent backplane, each of said plurality of storage devices equipped with a link resiliency circuit;
   a plurality of SSA targets serially connected to said SSA initiator, said SSA targets including said intelligent backplane and said plurality of storage devices;
   said intelligent backplane including:
      a controller coupled to said SSA initiator;
      at least one status register coupled to said controller and each one of said link resiliency circuits, each of said at least one status register indicating status of an operating parameter for each one of said link resiliency circuits;
      said controller polling each of said at least one status register to determine status of said operating parameter indicated by each one of said at least one status register for each of said link resiliency circuits and reporting occurrences of events related to said operating parameters to said SSA initiator; and
      at least one control register coupled to said controller and each one of said link resiliency circuits, each one of said at least one control register configured to transmit a command to a selected one of said link resiliency circuits in response to an instruction issued by said SSA initiator.

7. An SSA storage subsystem according to claim 6 wherein:
   each one of said at least one control register further comprises a control bit corresponding to each one of said link resiliency circuits;
   said link resiliency circuits executing said command in response to assertion of said corresponding control bit by said SSA initiator.

8. An SSA storage subsystem according to claim 7 wherein said command controls time required for said link resiliency circuits to heal line faults.

9. An SSA storage subsystem according to claim 8 wherein:
   each one of said at least one status register further comprises a status bit corresponding to each one of said SSA target storage devices;
   said link resiliency circuits asserting said corresponding status bit upon occurrence of an event related to said first operating parameter.

10. An SSA storage subsystem according to claim 9 wherein a first one of said at least one status register indicates presence of line faults detected by said link resiliency circuits.

11. A computer system comprising:
   a processor;
   memory coupled to the processor; and
   a serial storage architecture (SSA) storage subsystem coupled to the processor, the SSA storage subsystem including
      a backplane;
      first and second storage devices coupled to said backplane, said first storage device equipped with a first link resiliency circuit and said second storage device equipped with a second link resiliency circuit;
      an SSA initiator;
      a plurality of SSA targets serially connected to said SSA initiator, said SSA targets including said backplane and said first and second storage devices;
      a first status register coupled to said first and second link resiliency circuits, said first status register indicating presence of line faults detected by said first and second link resiliency circuits; and,
      a controller coupled to said first status register and said SSA initiator, said controller polling said first status register to determine if said first and second link resiliency circuits have detected line faults and reporting detected line faults to said SSA initiator.

12. A computer system according to claim 11 wherein:
   said first status register further comprises a status bit for each of said first and second link resiliency circuits;
   upon detection of a line fault thereby, said first and second link resiliency circuits asserting said respective status bit.

13. A computer system according to claim 12 wherein the SSA storage subsystem further includes:
   first and second disk bays for respectively connecting said first and second storage devices to said backplane.

14. A computer system according to claim 13 wherein the SSA storage subsystem further includes:
   a second status register coupled to said first and second link resiliency circuits, said second status register indicating presence of said first and second storage devices in said first and second disk bays, respectively.

15. A computer system according to claim 14 wherein:
   said second status register further comprises a status bit for each of said first and second link resiliency circuits;
   upon absence of one of said first and second storage devices from said corresponding disk bays, said first and second link resiliency circuits asserting said respective status bit.

16. A computer system comprising:
   a processor;
   memory coupled to the processor; and,
   a serial storage architecture (SSA) storage subsystem coupled to the processor, the SSA storage subsystem including
      an intelligent backplane;
      a plurality of storage devices coupled to said intelligent backplane, each of said plurality of storage devices equipped with a link resiliency circuit;
      a plurality of SSA targets serially connected to said SSA initiator, said SSA targets including said intelligent backplane and said plurality of storage devices;
      said intelligent backplane including:
         a controller coupled to said SSA initiator;
         at least one status register coupled to said controller and each one of said link resiliency circuits, each of said at least one status register indicating status of an operating parameter for each one of said link resiliency circuits;

said controller polling each of said at least one status register to determine status of said operating parameter indicated by each one of said at least one status register for each of said link resiliency circuits and reporting occurrences of events related to said operating parameters to said SSA initiator; and at least one control register coupled to said controller and each one of said link resiliency circuits, each one of said at least one control register configured to transmit a command to a selected one of said link resiliency circuits in response to an instruction issued by said SSA initiator.

17. A computer system according to claim 16 wherein:

each one of said at least one control register further comprises a control bit corresponding to each one of said link resiliency circuits;

said link resiliency circuits executing said command in response to assertion of said corresponding control bit by said SSA initiator.

18. A computer system according to claim 17 wherein said command controls time required for said link resiliency circuits to heal line faults.

19. A computer system according to claim 18 wherein:

each one of said at least one status register further comprises a status bit corresponding to each one of said SSA target storage devices;

said link resiliency circuits asserting said corresponding status bit upon occurrence of an event related to said first operating parameter.

20. A computer system according to claim 19 wherein a first one of said at least one status register indicates presence of line faults detected by said link resiliency circuits.

* * * * *